United States Patent [19]

Fuse

[11] Patent Number: 5,677,726
[45] Date of Patent: Oct. 14, 1997

[54] IMAGE READING APPARATUS

[75] Inventor: Takanobu Fuse, Tokyo, Japan

[73] Assignee: Konica Corporation, Tokyo, Japan

[21] Appl. No.: 446,408

[22] Filed: May 22, 1995

[30] Foreign Application Priority Data

May 26, 1994 [JP] Japan .................................... 6-112813

[51] Int. Cl.$^6$ ........................................................ B41J 2/47
[52] U.S. Cl. .......................... 347/260; 347/262; 347/247
[58] Field of Search .................................. 347/259, 260, 347/262, 247, 237

[56] References Cited

U.S. PATENT DOCUMENTS

| | | | |
|---|---|---|---|
| 4,397,521 | 8/1983 | Antos et al. | 359/217 |
| 4,807,156 | 2/1989 | Parisi | 395/102 |
| 5,017,944 | 5/1991 | Kitamura et al. | 347/252 |

*Primary Examiner*—Mark J. Reinhart
*Attorney, Agent, or Firm*—Frishauf, Holtz, Goodman, Langer & Chick

[57] ABSTRACT

In an image reading apparatus, an optical unit goes out from a reference stop position, reads an image from a document, and returns to the reference stop position. A position sensor detects a position of the optical unit and output a trigger signal when the optical unit comes to a predetermined position. There is provided a frequency divider to divide a frequency of a pulse signal used to detect the rotations of a driving motor, a pulse width detector to detect the divided pulse width in response to the trigger signal, and a rectifier to rectify an braking amount applied onto the driving motor in accordance with the pulse width so that the optical unit is stopped at the reference stop position.

2 Claims, 3 Drawing Sheets

IMAGE READING APPARATUS

BACKGROUND OF THE INVENTION

The present invention relates to a digital or an analog type of image reading apparatus for use in an image recording apparatus such as a copying machine in which an optical unit scans a document and reads an image from it.

The digital type image recording apparatus has come to be widely used, in addition to the analog type image reading apparatus which has been already widely used up to this time.

In the digital type image reading apparatus, a light source and a mirror system are mounted in a optical unit, and image information of a document is obtained as an optical signal by the irradiating light from the light source and by the moving scan of the mirror system. The optical signal is formed on picture-taking elements such as CCDs through a lens system, and converted into an electric signal so that the image information is stored in the form of an image signal in a memory. When a recording is started, the image signal is inputted into a laser writing section in an image recording apparatus.

After the optical unit has completed its scanning motion to obtain the image information from the document, the moving direction of the optical unit is reversed and its speed is reduced with a braking action, thereby the optical unit is controlled to return to a reference stop position which corresponds to an initial position before start of the scanning motion.

Hitherto, a control means to stop the optical unit at the reference stop position on the initial position has been proposed and put into actual use. In a widely used technique as one example, an FG pulse signal generating means which generates an FG pulse signal used to detect revolutions is provided to a driving motor of the optical unit, the FG pulse which is fed back from the driving motor on the return stroke of the optical unit is converted into a signal by an F/V conversion. The signal is monitored before the optical unit is returned to a motor stop position, and the signal is compared with a reference voltage so as to rectify the braking amount so that the optical unit is stopped at the reference stop position. However, in this control technique, data converted by the F/V conversion is apt to be affected by noise. Further, since its construction comprises a conversion circuit, there has been the drawback that the construction inevitably became complicated.

An object of the present invention is to provide an image reading apparatus which can eliminate any positional deviation in the reference stop position of the driving motor caused by temperature increase and/or load fluctuation.

SUMMARY OF THE INVENTION

In an image reading apparatus comprising an optical unit which moves from a reference stop position so as to read an image from a document and return to the reference stop position after the reading, the above object is attained by the image reading apparatus characterized by comprising a sensor to detect the position of the optical unit before the reference stop position and to output a trigger signal; a pulse signal generating means which generates a pulse signal used to detect a revolution provided to a driving means of the optical unit; a frequency dividing circuit to divide the frequency of the pulse signal generated by the pulse signal generating means; a detection means to detect the pulse width of a signal wave obtained by the frequency dividing in response to the trigger signal outputted from the sensor; and a rectifying means for adjusting the braking amount for the driving motor on the basis of the pulse width detected by the detection means.

DETAILED DESCRIPTION OF THE PREFERRED EMBODIMENT

One embodiment of the present invention will be explained with reference to FIGS. 1 through 3.

Figure 1:
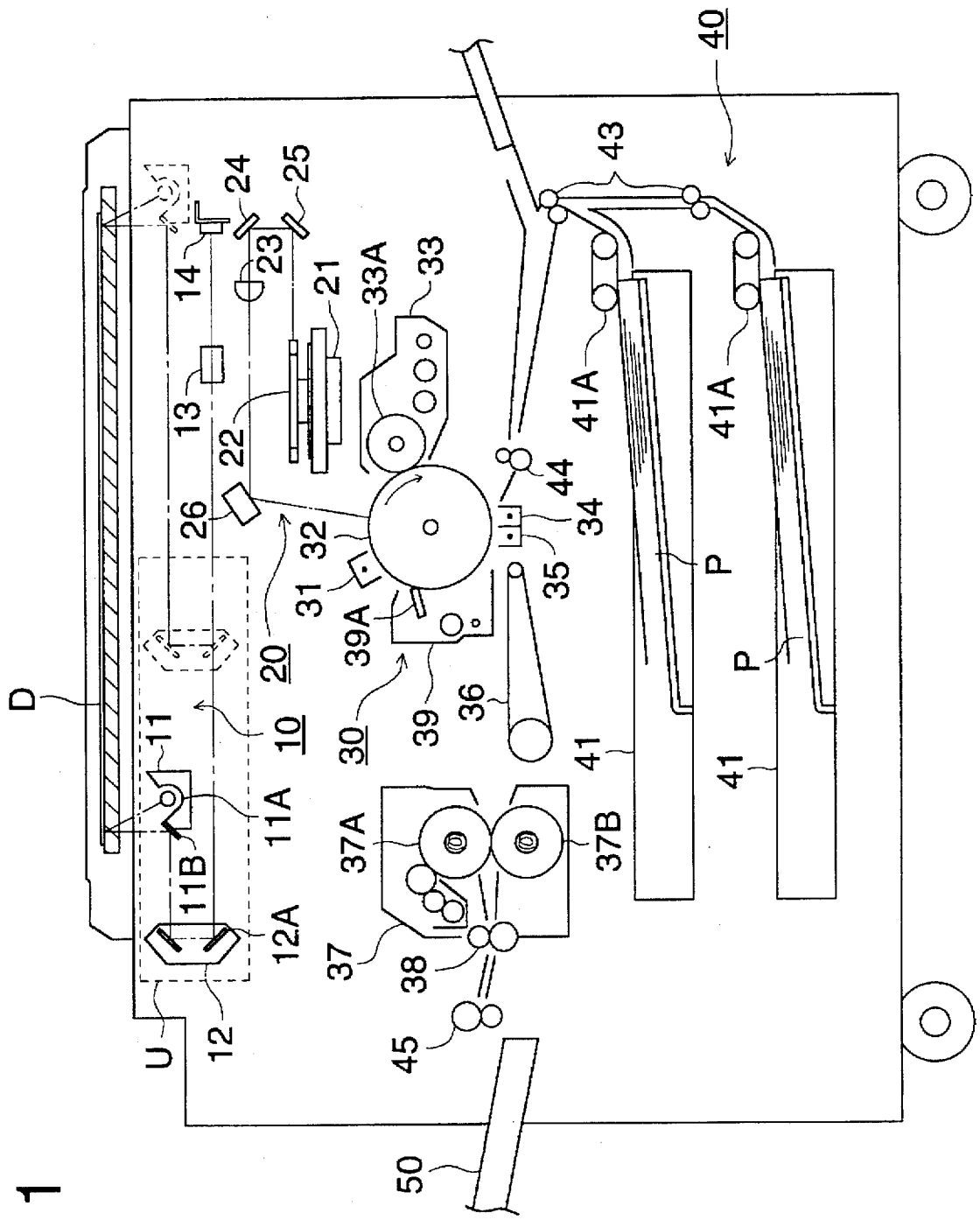
FIG. 1 is a sectional view showing a construction of an image recording apparatus equipped with an image reading apparatus of the present invention.

FIG. 1 shows a structural example of an image recording apparatus with an image reading device, and the image recording apparatus is composed of an image reading section 10, a laser writing section 20, an image forming section 30 and a sheet feeding section 40.

The image reading section is provided with an optical unit U which is composed of a first mirror unit 11 provided with a rod-shaped irradiating lamp 11A and a mirror 11B and a second mirror unit 12 on which a pair of mirrors 12A are arranged opposite to each other. An image of a document D placed on a document platen is scanned with an exposure light by a parallel movement of the first mirror unit 11 from a position indicated in the drawing with solid lines and a position indicated with broken lines and by a following movement of the second mirror unit 12 with a speed half that of the first mirror unit 11. Thus, an image is formed through an image forming lens 13 on picture-taking elements 14 by which the image is photoelectrically converted into electric signals. The electric signals are subjected to image processing in an image processing section which is not indicated in the drawings, and then the electric signals are temporally stored as image signals in a memory.

Thereafter, when the image signals are inputted into a laser writing section 20, a laser beam generated by a semiconductor type laser generator is deflected by a polygonal mirror rotated by a driving motor 21, and is introduced through a fΘ lens 23 and a reflecting optical system composed of mirrors 24,25 and 26 onto the photosensitive surface of a photoreceptor drum 32 which is electrically charged in advance to a given electrical potential by a charging device 31 so that the laser beam conducts a scanning exposure on the photosensitive surface so as to form a latent image on the surface. Accordingly, a latent image corresponding to the image on the document D is formed on the peripheral surface of the photosensitive drum 32 through the primary scanning by the scanning motion of the laser beam and the secondary scanning by the rotation of the photosensitive drum 32. The latent image is developed by toner carried on a developing sleeve 33A of a developing device 33 by the reversal development technique so as to form a toner image.

On the other hand, a transfer sheet P of a designated size is delivered from a corresponding one of sheet cassettes 41 mounted on a sheet feeding section 40 by the work of a delivery roller 41A in the sheet cassettes 41, and is conveyed through a conveyance roller 43 toward to an image transfer section.

The conveyed transfer sheet P is adjusted its conveyance timing by a register roller 44 and is further conveyed to the transfer section in synchronization with the movement of the toner image on the periphery surface of the photosensitive drum 32, and is charged by the charging device 34 so that the toner image is transferred onto the transfer sheet P.

Thereafter, the transfer sheet P on which the toner image has been transferred is separated from the peripheral surface of the photosensitive drum 32 under the discharging action by a separating device 35, and is conveyed by a conveyance belt 36 to a fixing device 37 in which the toner image is fused and fixed onto the transfer sheet P with heat and pressure between an upper roller 37A and a lower roller 37B. After the fixing process, the transfer sheet P is discharged from the fixing device 37 by a conveyance roller 38.

The discharged transfer sheet P is delivered onto a tray 50 by a delivery roller 45.

The photosensitive drum 32 from which the transfer sheet has been separated is cleaned by a cleaning device 39 in which residual toner is removed from the photosensitive drum 32 by a blade 39A which is brought into contact with the photosensitive drum 32. Thereafter, the photosensitive drum 32 will be charged again by the charging device 31 and be subjected to the next image forming process.

In the image forming apparatus explained above, as an example, the photosensitive drum 32 is a OPC (organic photoconductor) photosensitive member having a diameter of 80 mm and is rotated with a line speed of 280 mm/sec. during the image forming period. The charging device 31 for charging the photosensitive member is a scorotron type charger equipped with a grid and conducts uniform charging to charge a photosensitive surface to an electric potential of −700 V. A semiconductor type laser generator to conduct a latent image formation in the laser writing section 20 generates a laser beam whose output wavelength is 780 nm and output power is 5 mW. The semiconductor type laser generator can conduct a pulse width modulation with levels of 256 gradations by 8 bit ($\phi\phi$-255) signals. A two component type developer composed of a toner and a carrier is used as a developing agent. The toner is a polyester type and has an average particle size of 8.5 µm. The carrier is made of a ferrite coated with a resin and has a weight average particle size of 60 µm. A developing sleeve 33A of the developing device 33 has a diameter of 40 mm and is rotated at 300 rpm. A developing bias voltage of −600 V is applied between the developing sleeve 33A and the photosensitive drum 32 The reversal development is conducted for the latent image portion with the developing distance of 500 µm.

The first mirror unit 11 and the second mirror unit 12 both are provided in the optical unit U which is driven by a DC driving motor M. Each of the first mirror unit 11 and the second mirror unit 12 is moved horizontally at a speed different from each other from a respective initial position indicated with solid lines to a respective scanning-completion position indicated with broken lines, changed its moving direction by the reverse rotation of the driving motor M simultaneously with a time that the scanning is completed, and returned to a reference stop position on the initial position so that each mirror unit is returned to its respective position indicated with the solid lines.

Figure 2:
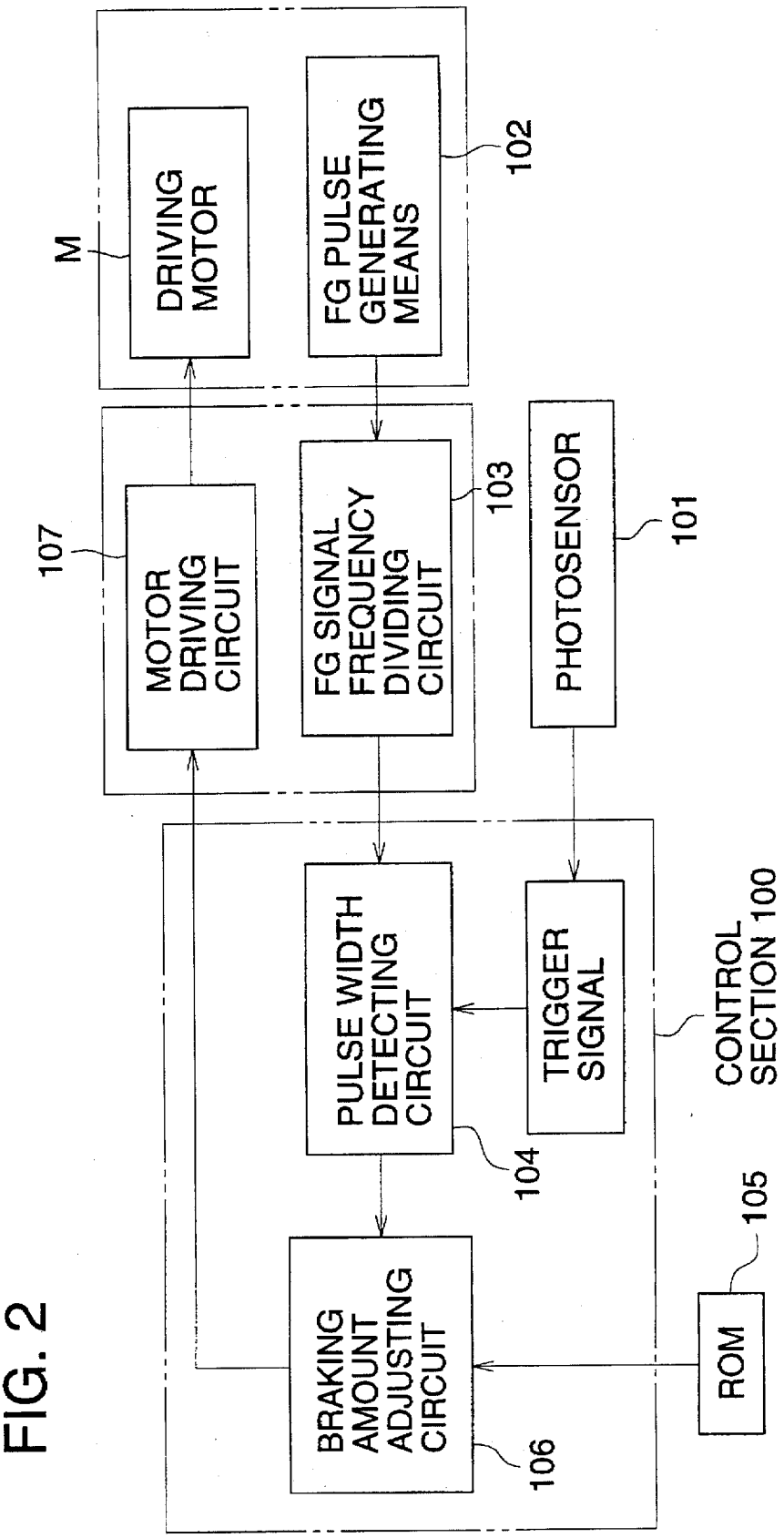
FIG. 2 is a block diagram showing a rectification control circuit which controls a driving motor on its return stroke.
Figure 3:
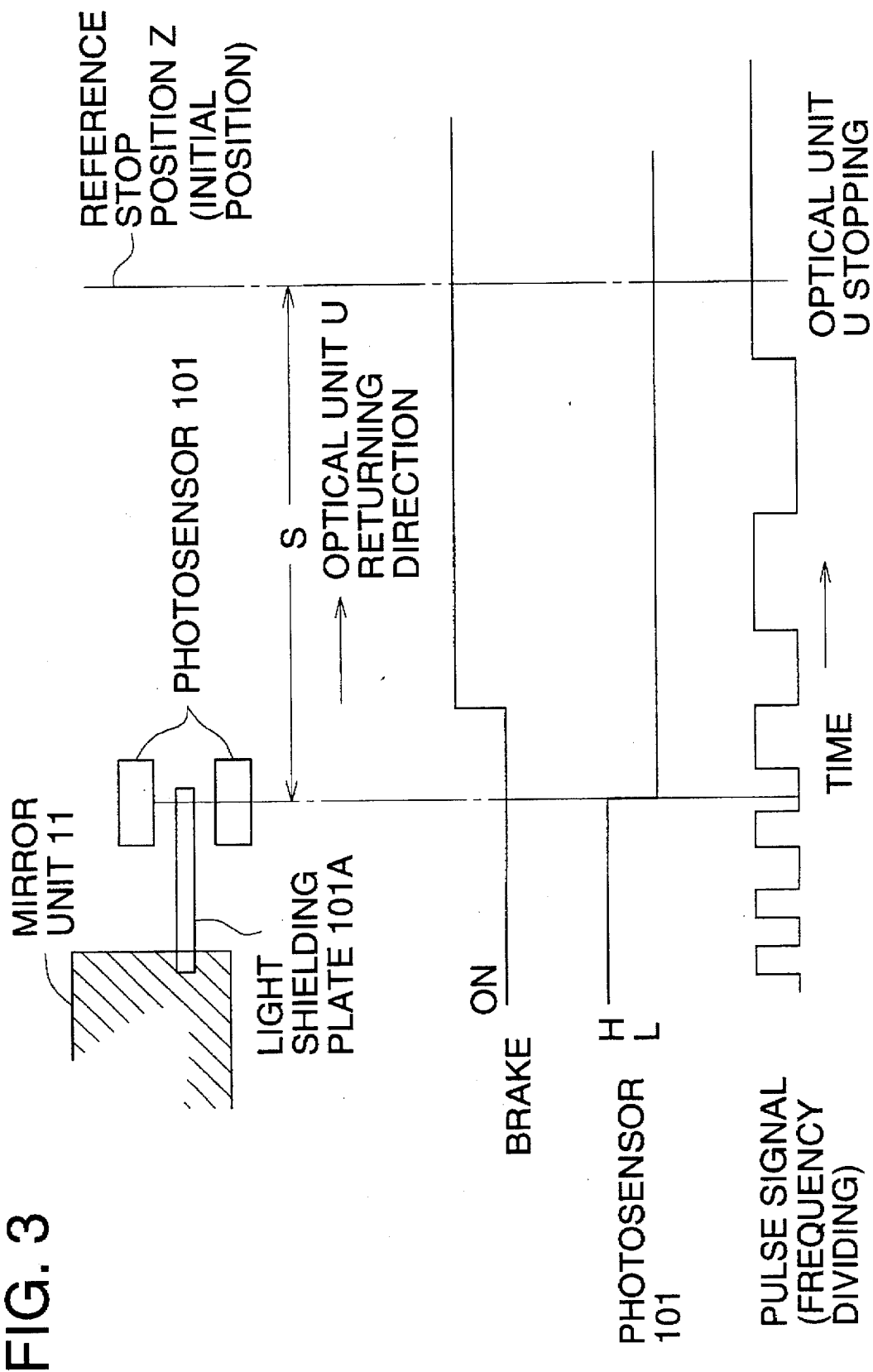
FIG. 3 is an explanatory diagram showing the return position of the optical unit and a timing chart.

FIG. 2 shows an automatic rectification control circuit of the present invention which automatically returns the optical unit U to the reference stop position, with high precision. FIG. 3 is an explanatory diagram showing a technique by which a braking amount for the driving motor M is controlled in response to a trigger signal which is obtained by detecting a position of the optical unit on its returning path by a sensor of the present invention and the optical unit is stopped at its reference stop position. On an upper part in FIG. 3 is illustrated a positional relation between the sensor and the reference stop position, and on an lower part is illustrated a time chart.

A stop position detection sensor 101 to conduct a position detection of the optical unit U (or the first mirror unit 11 in this example) is provided at a position located away with a distance S before the reference stop position Z to be returned to. In this example, a photosensor 101 provided on the apparatus body is used as the stop position detection sensor 101. When a light shielding plate 101A provided on the first mirror unit 11 blocks the light path of the photosensor 101, an "L" signal is outputted from the sensor 101, thereby the position of the first mirror unit is detected.

An FG pulse signal generating means 102 which generates an FG signal used to detect revolutions is provided on a driving shaft of the driving motor M to drive the optical unit U so that a fluctuating FG signal may be generated in correspondence with any fluctuations in the rotation of the driving motor M. Thus generated FG pulse signals are converted or subjected to a frequency dividing process from a high frequency wave signal to a low frequency wave signal in a FG signal frequency dividing circuit 103.

On the other hand, a pulse width detection circuit 104 detects the pulse width of the frequency-divided FG pulse signal inputted from the FG signal frequency dividing circuit 103 in response to the "L" signal used as a trigger signal which is outputted when the light-shielding plate 101A provided on the first mirror unit 11 blocks the light path of the photosensor 101 during the course of the return stroke of the optical unit U to the initial position (the reference stop position Z). The detected pulse width has the relationship in that the pulse width becomes smaller when the returning speed of the first mirror unit 11 becomes faster, and, in contrast, it becomes larger when the returning speed of the first mirror unit becomes slower. Incidentally, as a method of detecting the speed from the FG pulse signal, there is a method in which a number of the FG pulse is counted for a given period. The method in which the pulse width is detected makes it possible to detect the speed more precisely in real time.

In a ROM 105, the correlation between the pulse width and the braking amount to be applied to the driving motor M is stored. The stored braking amount is the braking amount to be applied to the driving motor M in response to the correlated pulse width which is detected from the speed of the first mirror unit 11 when the first mirror unit 11 moved by the driving motor M passes by the photosensor 101. The value of the braking amount is determined so that when the braking amount is applied to the driving motor, the first mirror unit 11 is moved from the position of the photosensor 101 only the specific distance S and is stopped at the reference stop position Z.

A control section 100 calls the braking amount corresponding to the pulse width detected by a braking amount adjusting circuit 106 from the ROM 105, applies a braking force corresponding to the braking amount onto the driving motor M through the motor driving circuit 107. With the specific braking force, the optical unit U is stopped precisely at the reference stop position.

According to the present invention, since the FG signal is a signal directly fed back from the driving motor, it is barely affected by noise and provides reliability in monitoring the speed of the optical unit on the return stroke so that any error in terms of the stop position of the optical unit can be reduced to such precision that the error can be totally negated. Further, since there is no need to use an F/V converting circuit, it has an additional advantage in terms of lowered cost. As a result, the efficiency and reliability in reading images with the image reading apparatus of the present invention can be greatly enhanced.

What is claimed is:

1. An apparatus for reading an image, comprising an optical unit going out from a reference stop position, reading an image from a document, and returning to the reference stop position;

a position sensor to detect a position of the optical unit and output a trigger signal when the optical unit comes to a predetermined position before the optical unit returns to the reference stop position;

a driver having a rotating shaft to move the optical unit;

a signal generator provided to the driver, the signal generator generating a first pulse signal used to detect a rotation of the rotating shaft;

a frequency divider to divide a frequency of the first pulse signal so that a second pulse signal whose frequency is lower than the first pulse signal is obtained;

a pulse width detector to detect a pulse width of the second pulse signal in response to the trigger signal outputted from the position sensor; and a rectifier to rectify an braking amount applied onto the driver in accordance with the pulse width so that the optical unit is stopped at the reference stop position.

2. The apparatus of claim 1, wherein the position sensor comprises a photosensor located at a position corresponding to the predetermined position and a light shielding plate mounted on the optical unit so that when the optical unit comes to the predetermined position, the light shielding plate blocks a light passage to the photosensor.

* * * * *